3,574,757
PROCESS FOR THE PREPARATION OF CYCLOHEXANONE
Richard E. Collier, Chester, Va., assignor to Allied Chemical Corporation, New York, N.Y.
No Drawing. Continuation-in-part of application Ser. No. 452,381, Apr. 30, 1965. This application Nov. 22, 1967, Ser. No. 684,947
Int. Cl. C07c 45/00
U.S. Cl. 260—586                             8 Claims

ABSTRACT OF THE DISCLOSURE

More specifically, the invention relates to improving yields of cyclohexanone while reducing undesirable by-product formation in the production of cyclohexanone by hydrolytic cleavage of a bicyclic unsaturated ketone which can be 2-cyclohexylidenecyclohexanone or 2(1-cyclohexen-1-yl) cyclohexanone in the presence of caustic alkali, said improvement being effected by employing superheated steam and commencing the reaction with little or no water present in the starting mixture of bicyclic ketone and caustic alkali.

---

This application is a continuation-in-part of my prior application Ser. No. 452,381, filed Apr. 30, 1965, now abandoned.

The present invention relates to an improved method of preparing cyclohexanone. In particular, it relates to an improved process for the hydrolytic cleavage of certain bicyclic unsaturated ketones to cyclohexanone.

The unsaturated bicyclic ketones 2(1-cyclohexen-1-yl) cyclohexanone and 2-cyclohexylidenecyclohexanone are formed in substantial amounts as by-products in the catalytic dehydrogenation of cyclohexanol to cyclohexanone, a valuable precursor of caprolactam.

To recover cyclohexanone values it is known (German Pats. 927,688 and 946,443) to cleave hydrolytically the aforementioned bicyclic ketones in the presence of dilute aqueous caustic alkali at elevated temperatures and superatmospheric pressures. This procedure provides only moderate yields of cyclohexanone, ca. 50–60% of theory based on bicyclic ketone charged, and moreover requires costly pressure equipment. Recently it has been proposed (Czech Pat. 95,459) to effect the cleavage reaction at atmospheric pressure by distilling cyclohexanone from a dilute alkaline reaction mass maintained at about 170 to 240° C. which initially contains water in an appreciable amount, i.e. greater than about 12% by weight. This process, however, affords no substantial improvement in the yield of cyclohexanone.

It is the object of the present invention to devise an improved process for preparing cyclohexanone by hydrolytic cleavage of 2-cyclohexylidenecyclohexanone and 2(1-cyclohexen-1-yl) cyclohexanone.

This and other objects and advantages of my invention will be obvious from the following description of my invention.

I have discovered that the disadvantages of the aforementioned prior art processes are overcome and better yields of cyclohexanone are produced by a novel improvement in the hydrolytic cleavage of a bicyclic unsaturated ketone of the group consisting of 2-cyclohexylidenecyclohexanone and 2(1-cyclohexen-1-yl) cyclohexanone. The novel improvement consists in contacting a substantially anhydrous mixture comprising said bicyclic ketone and caustic alkali with superheated steam.

The novel step of employing little or no water in the initial reaction charge produces yields of cyclohexanone generally about 15–20% higher than those obtained by the prior art.

In carrying out the process the reaction mixture comprising unsaturated ketone and caustic alkali is heated to at least about 170° C. and contacted with superheated steam so as to effect steam distillation of product cyclohexanone. The distillation is continued until the aqueous distillate obtained is no longer cloudy, indicating the distillation of organic material from the reaction mass has ceased. A small amount of the unsaturated ketone generally distills with the cyclohexanone, but this material is readily recovered from the distillate by conventional methods and if desired may be recycled to the reaction zone.

Preferably an anhydrous reaction mixture, i.e. a mixture free from liquid phase water is charged to the steam distillation. However, minor amounts of water, up to about 5% by weight of the reaction mass, can be tolerated without loss of all of the advantages of the invention and is included within the meaning of the phrase "substantially anhydrous."

The temperature maintained in the reaction mass during distillation, i.e. about 170–240° C. and the weight ratio of caustic alkali to unsaturated bicyclic ketone, i.e. about 0.01 to 0.6 are those prescribed by the prior art for effecting hydrolytic cleavage of the unsaturated ketone via steam distillation of cyclohexanone.

In the preferred embodiment of the present invention superheated steam at a temperature about 150–200° C. above that of the reaction mixture, i.e. steam at a temperature of about 320 C. to 440° C., is charged to the reaction zone in order to promote rapid production of cyclohexanone.

An especially good result is obtained, according to the present process, by passing steam at about 395–400° C. through a reaction mass maintained at about 180–200° C. containing about 0.04 part by weight of caustic per part by weight of bicyclic ketone.

As organic starting material the present invention contemplates 2 - cyclohexylidenecyclohexanone, 2(1 - cyclohexen-1-yl) cyclohexanone or a reaction residue containing either or both of these compounds, for example, the residue obtained in the well known catalytic dehydrogenation of cyclohexanol to cyclohexanone.

Any caustic alkali may be used in the present process, but preferably readily available sodium hydroxide or potassium hydroxide is employed.

The novel method can be carried out in apparatus conventionally employed to effect distillation with steam. Inasmuch as the process can be operated at atmospheric pressure, use of costly pressurized equipment may be avoided. The process of the invention may also be carried out at subatmospheric pressures and at superatmospheric pressures which may range up to about 50 atmospheres. Operation at about atmospheric pressure ranging up to about 15 atmospheres will of course be preferred to obtain the added advantage of avoiding use of high pressure equipment. As will be obvious to those skilled in the art, the present process is readily adaptable to operation on a continuous basis.

The following examples illustrate my invention but it is to be understood that the invention is not to be limited by the specific details thereof and that changes can be made without departing from the spirit or scope of the invention. The temperatures are in degrees centigrade and parts and percentages unless otherwise noted are by weight.

EXAMPLE 1

A mixture of 200 parts (1.124 mol) of 2(1-cyclohexen-1-yl) cyclohexanone and 8 parts (0.143 mol) of solid potassium hydroxide was heated to 180° and distilled with steam (8 to 10 parts by volume per minute) which had been preheated to 400°. During distillation the reaction mass was maintained at a temperature of about 180–200°. The steam effluent was condensed and collected. The aqueous distillate (534 parts) contained 173.3 parts cyclohexanone and 15.97 parts of unchanged 2(1-cyclohexen-1-yl) cyclohexanone. Over 90% of the bicyclic ketone was attacked and the yield of cyclohexanone was 78.7% of theory.

The following operation conducted for purposes of comparison demonstrated that the presence of appreciable water in the reaction mixture resulted in a lower recovery of cyclohexanone.

A mixture of 200 parts (1.124 mol) 2(1-cyclohexen-1-yl) cyclohexanone, 8 parts (0.143 mol) of potassium hydroxide and 100 parts water (32.5% of the mixture) was heated under agitation to 100° and contacted with superheated steam at 395° as described in Example 1. Thereafter the temperature of the mixture was maintained at about 180–200°. The steam distillate produced contained 109.8 parts of cyclohexanone together with 85.6 parts of unreacted 2(1-cyclohexen-1-yl) cyclohexanone. This represented an attack of less than 60% on the bicyclic ketone, and the recovery of cyclohexanone was 49.9% of theory.

2 - cyclohexylidenecyclohexanone may be substituted for 2(1-cyclohexen-1-yl) cyclohexanone in the above examples. The invention may be applied to residues of catalytic dehydrogenation of cyclohexanol to produce cyclohexanone, which residues contain either or both of the above bicyclic ketones.

I claim:
1. In the process of preparing cyclohexanone by hydrolytically cleaving an unsaturated bicyclic ketone seleted from the group consisting of 2-cyclohexylidenecyclohexanone and 2(1-cyclohexen-1-yl) cyclohexanone in admixture with caustic alkali at a temperature of at least about 170° C., the improvement which comprises contacting superheated steam of a temperature of at least about 320° C. with a substantially anhydrous mixture of caustic alkali and said bicyclic ketone containing initially no more than about 5% water at from about atmospheric pressure to 15 atmospheres to effect steam distillation of the cyclohexanone product.

2. The process of claim 1 wherein the mixture of alkali and ketone is at substantially atmospheric pressure.

3. The process of claim 1 in which the superheated steam is at a temperature between about 320° C. and 440° C. and the reaction mixture of caustic alkali and bicyclic ketone is regulated at a temperature between about 170° C. and 240° C.

4. The process of claim 3 wherein the mixture of alkali and ketone is under substantially atmospheric pressure.

5. The process according to claim 3 wherein the bicyclic ketone is 2(1-cyclohexen-1-yl) cyclohexanone.

6. The process according to claim 4 wherein said alkali is potassium hydroxide.

7. The process of claim 3 wherein the mixture of caustic alkali and bicyclic ketone is anhydrous.

8. The process of claim 3 wherein the weight ratio of caustic alkali to bicyclic ketone is in the range about 0.01 to 0.6.

References Cited
FOREIGN PATENTS

| | | | |
|---|---|---|---|
| 1,007,772 | 5/1957 | Germany | 260—586 |
| 95,459 | 6/1960 | Czechoslovakia | 260—586 |

OTHER REFERENCES

Freidlin et al.: "Izvest. Akao. Nauk. U.S.S.R., Otdel. Khim. Nauk.," pp. 512 to 514 (1957), Q4.A5.

Richter, "Chem. Abst.," vol. 52, col. 15444(a) (1958), QD1.A51.

LEON ZITVER, Primary Examiner

N. P. MORGENSTERN, Assistant Examiner